US009132906B2

(12) United States Patent
Fort et al.

(10) Patent No.: US 9,132,906 B2
(45) Date of Patent: Sep. 15, 2015

(54) AIRCRAFT PANEL COMPRISING AN OPENING EQUIPPED WITH A SURROUND

(75) Inventors: Frederic Fort, Saint Genies Bellevue (FR); Laurent Gauthie, Tournefeuille (FR)

(73) Assignee: Airbus Operations S.A.S. (FR)

(*) Notice: Subject to any disclaimer, the term of this patent is extended or adjusted under 35 U.S.C. 154(b) by 995 days.

(21) Appl. No.: 13/280,545

(22) Filed: Oct. 25, 2011

(65) Prior Publication Data

US 2012/0097794 A1 Apr. 26, 2012

(30) Foreign Application Priority Data

Oct. 26, 2010 (FR) .................................... 10 58793

(51) Int. Cl.
*B64C 1/14* (2006.01)

(52) U.S. Cl.
CPC .................................. *B64C 1/1492* (2013.01)

(58) Field of Classification Search
USPC ............... 244/129.3, 129.4, 131; 52/204.597
See application file for complete search history.

(56) References Cited

U.S. PATENT DOCUMENTS 4,007,536 A * 2/1977 Soderberg .................. 29/421.1
4,291,816 A 9/1981 Lamoureux
2008/0067288 A1* 3/2008 Eberth et al. ............. 244/129.3
2010/0043300 A1 2/2010 Krafn

FOREIGN PATENT DOCUMENTS

DE 102006053967 A1 5/2008
FR 836573 A 1/1939
WO 2009/003954 A1 1/2009

OTHER PUBLICATIONS

French Search Report, FR 1058793, dated May 26, 2011.

* cited by examiner

*Primary Examiner* — Rob Swiatek
(74) *Attorney, Agent, or Firm* — Lerner, David, Littenberg, Krumholz & Mentlik, LLP

(57) ABSTRACT

An aircraft panel, notably a fuselage panel of the aircraft, includes at least one opening equipped with a surround intended to accept a closing-off device that closes off the opening. The panel includes at least one exterior surface. The surround surrounding the opening is fixed to the panel, forming an interface for fitting the closing-off device, and includes at least one lip extending towards the center of the opening. The lip supports the closing-off device. The surround has an external face interposed between the exterior surface of the panel and the closing-off device. The surround includes fixing apparatus which works by gripping the edge of the opening of the panel.

10 Claims, 2 Drawing Sheets

44
42
70
44
50
72
54
-60-
48
40
52
46
-68-

AIRCRAFT PANEL COMPRISING AN OPENING EQUIPPED WITH A SURROUND

BACKGROUND OF THE INVENTION

The present invention relates to an aircraft panel design comprising an opening equipped with a surround.

The structure of an aircraft generally comprises several panels through which are made openings that are closed off by elements that may or may not be transparent.

FIG. 1 illustrates, in cross section, a known arrangement of the surround 10 of an opening 12 made in an aircraft fuselage panel 14 being fitted with a window 16.

Thus, according to this prior art, the surround 10 used to attach the window-pane 18/window-seal 20 assembly to the opening 12 consists of a single surround component 22 in the form of an angle section straddling the edge 24 of the opening 12.

More specifically, the base 26 of the component 22 has a heel 28 that fits into the opening 12, and a horizontal part 30 pressed against the edge 24 of the opening 12 and fixed to the panel 14.

The heel 28 then comprises a lip 34 extending towards the centre of the opening 12 to support the window-pane 18/window-seal 20 assembly, while a retaining device 33, that rests against a vertical extension 32 of the horizontal part 30, clamps the assembly from the other side.

In this prior-art design, the horizontal part 30 of the surround component 22 is fixed to the edge 24 of the opening 12 at numerous points, 70 to 100 points, to give a rough idea of scale, by piercing the panel and then riveting.

A first disadvantage with the design, in the case of a fuselage panel made of composite, is that the operations of drilling and counterboring the rivet holes are very awkward to perform near the edge 24 of the opening 12, especially in the case of a carbon-fibre-based composite.

Thus, because of the number of holes to be made for each opening 12 in an aircraft and because of the difficulty of performing the machining operations, the costs associated with fixing the surround components 22 for an aircraft are relatively high.

In addition, a second disadvantage is that the rivet holes and the number of them weaken the edge of the opening and impair the mechanical stability of the edge against deformations due to the flexing of the fuselage and to the cabin pressurizing forces.

BRIEF SUMMARY OF THE INVENTION

An embodiment of the invention includes a design that will allow a panel opening surround to be fitted without piercing, and therefore without weakening, the panel.

An aircraft panel comprises at least one opening equipped with a surround intended to accept a closing-off device that closes off the opening. The panel comprises at least one exterior surface. The surround surrounding the opening is fixed to the panel, forming an interface for fitting the closing-off device, and comprises at least one lip extending towards the centre of the opening. The lip supports the closing-off device. The surround has an external face interposed between the exterior surface of the panel and the closing-off device. The surround comprises fixing means which work by gripping the edge of the opening of the panel.

More specifically, the surround according to an embodiment of the invention is made of at least two independent components, an internal component and an external component, which are joined together and clamped to the edge of the opening in the panel.

Advantageously, the fixing by gripping allows the surround to be adapted to suit panels of substantially different thicknesses.

Thus it is possible to reduce the number of families of surrounds that have to be given part numbers and used to build an aircraft, this reduction being all the more advantageous in the case of an aircraft manufacturer who makes different models of aircraft.

An advantage of the present invention is the retaining device used in the prior art and that holds the window-pane/window-seal assembly pressed against the lip of a surround component is eliminated.

To do this, provision is made for adjustable means of holding the closing-off device such as a window against the lip to be incorporated into the surround according to an embodiment of the invention. The holding means clamps the window between the internal component and the external component.

BRIEF DESCRIPTION OF THE DRAWINGS

Other features and advantages will become apparent from the following description of the invention, which description is given solely by way of example and with reference to the attached drawings in which.

DETAILED DESCRIPTION

Figure 2:
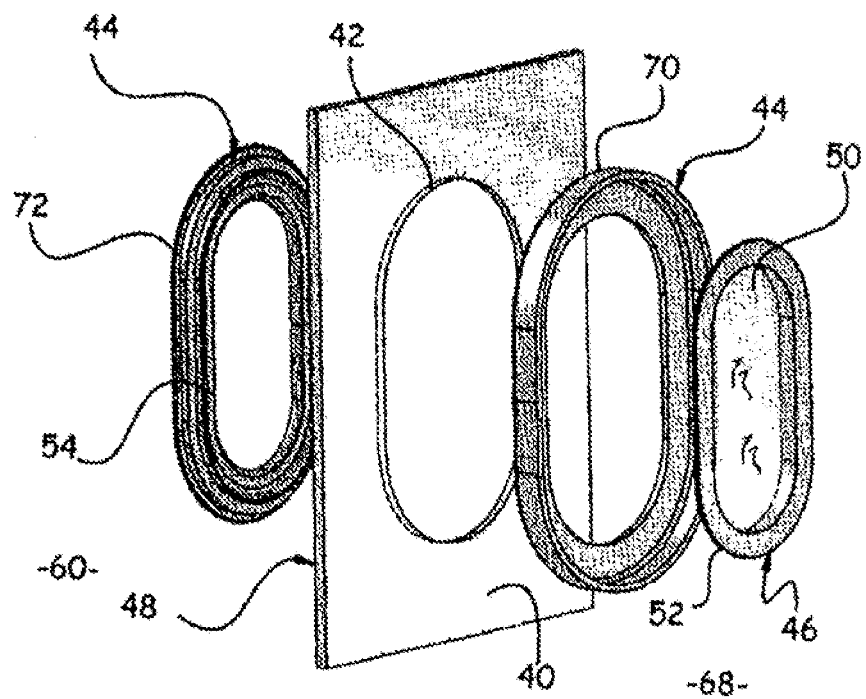
FIG. 2 is an exploded perspective view of an aircraft panel comprising an opening equipped with a surround according to a first embodiment of the invention.

According to a first embodiment of the invention, illustrated in FIG. 2, a substantially planar aircraft panel 40 comprises at least one opening 42 of oblong shape fitted with a surround 44 intended to accept a closing-off device 46 that closes off the opening 42.

The panel 40 is a fuselage panel at least one exterior surface 48 of which corresponds to the aerodynamic surface of the aircraft and the surround 44 forms an interface for fitting a closing-off device 46 that takes the form of at least one window pane 50 equipped with a peripheral seal 52, so as to form a window 46.

Figure 3:
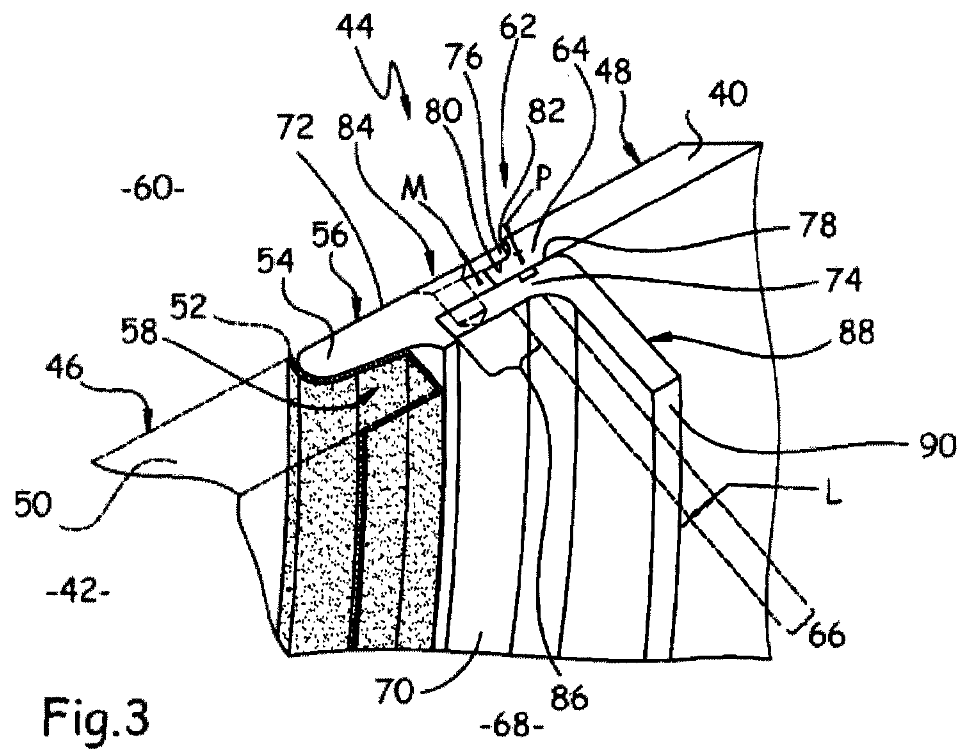
FIG. 3 is a view in cross section of an aircraft panel comprising an opening equipped with a surround according to the first embodiment of the invention.
Figure 4:
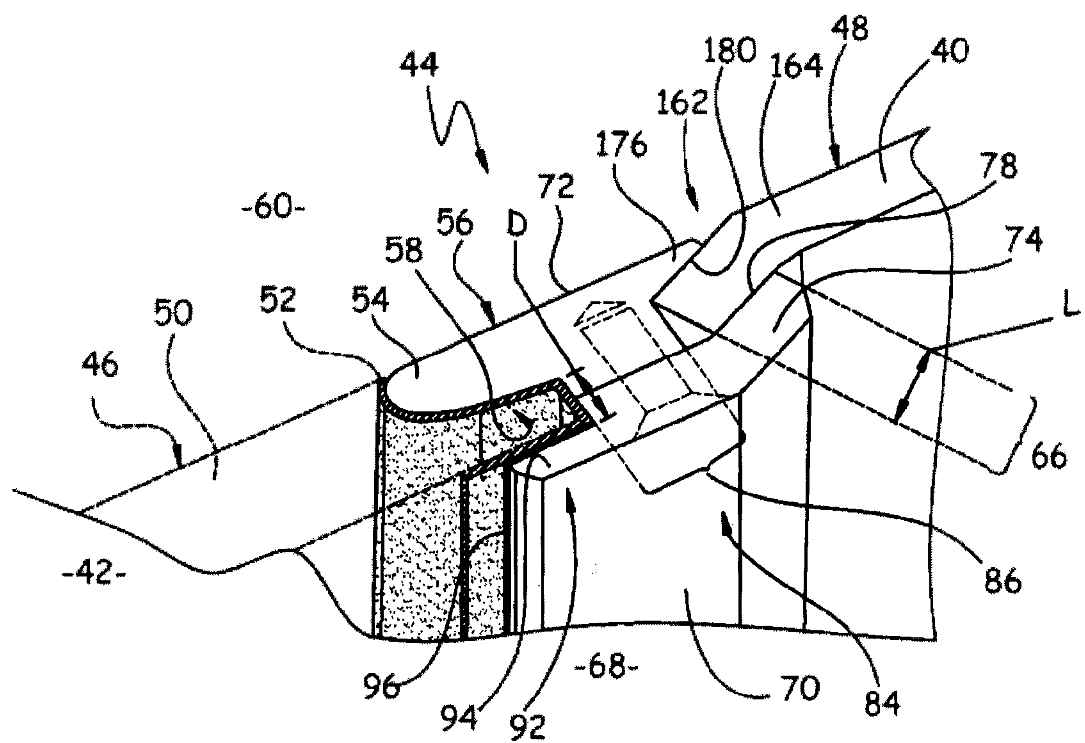
FIG. 4 is a view in cross section of an aircraft panel comprising an opening equipped with a surround according to a second embodiment of the invention.

As illustrated in FIGS. 2, 3 and 4, the surround 44 surrounds the circumference of the opening 42 and is fixed to the panel 40. The surround 44 comprises at least one lip 54 extending towards the centre of the opening 42, the lip 54 supporting the window 46 and being able to react the cabin pressurizing forces applied to the window 46.

The surround 44 surrounds the circumference of the opening 42 continuously.

The surround 44 has an external face 56 that is interposed between the exterior surface 48 of the panel 40 and the window 46, and the lip 54 has an internal face 58 against which the window pane 50 and its peripheral seal 52 press. The internal face 58 is inclined towards the inside of the opening 42 and towards the outside 60 of the panel 40, namely of the aircraft, so as to make the window pane 50 easier to position and the seal easier to compress.

The external face 56 of the surround 44 extends substantially in the continuation of the exterior surface 48 of the panel 40, in order to maintain the aerodynamic continuity of the fuselage.

As illustrated in FIG. 3, the surround 44 comprises fixing means 62 which work by gripping the edge 64 of the opening 42.

At least a portion 66, of non-zero length L, of the edge 64 is clamped from the outside 60 and from the inside 68 of the panel 40 by the surround 44.

The portion 66 is situated at the end of the edge 64 and is clamped over the entire circumference of the opening 42.

To achieve this, the surround 44 is made in at least two independent components, an internal component 70 and an external component 72, which are positioned one on each side of the panel 40 and are joined together in such a way as to clamp the edge 64 of the opening 42.

Thus, the internal 70 and external 72 components are respectively positioned on the inside 68 and on the outside 60 of the panel 40.

Each of the internal 70 and external 72 components respectively comprises a lateral extension (74, 76) on its respective side (68, 60) of the panel 40 and in the direction away from the centre of the opening 42, each extension (74, 76) respectively comprising at least one face (78, 80) resting from its side (68, 60) against the edge 64 of the panel 40 and covering at least the portion 66, of non-zero length L, of the edge 64.

As illustrated in FIGS. 2 and 3, in a first alternative form of the fixing means 62, the edge 64 of the opening 42 is straight and comprises a recess 82 on the outside 60 of the panel 40 to accept the lateral extension 76 of the external component 72.

Because the recess 82 takes the form of a shoulder produced over the entire circumference of the opening 42, the recess 82 and the face 80 of the lateral extension 76 have substantially identical profiles so as to minimise the fitting clearance between the surround 44 and the panel 40.

With the external face 56 of the surround 44 borne by the external component 72, the depth P of the recess 82 and the thickness M of the lateral extension 76 are dimensioned so that the external face 56 lies flush with the exterior surface 48 of the panel 40 or is inset towards the inside 68 of the panel 40.

Thus, the recess 82 allows the creation of fixing means 62 which work by gripping while at the same time allowing the external face 56 to be kept substantially in the continuation of the exterior surface 48 of the panel 40, thus maintaining the aerodynamic continuity of the fuselage.

As illustrated in FIG. 4, in a second alternative form of the fixing means 162, the edge 164 of the opening 42 is turned in towards the inside 68 of the panel 40 and towards the centre of the opening 42 to accept the lateral extension 176 of the external component 72.

In this way, the face 180 of the lateral extension 176 that comes to press against the turned-in edge 164 of the panel 40 is inclined towards the inside 68 of the panel 40 and towards the centre of the opening 42.

The inclination of the turned-in edge 164 and the inclination of the face 180 are substantially identical in order to minimize the fitting clearance between the surround 44 and the panel 40.

With the external face 56 of the surround 44 being borne by the external component 72, the inclination of the turned-in edge 164 and the inclination of the face 180 are dimensioned so that the external face 56 lies flush with the exterior surface 48 of the panel 40 or is inset towards the inside 68 of the panel 40.

Thus, the turned-in edge 164 allows the creation of fixing means 62, which work by gripping, while at the same time making it possible to keep the external face 56 substantially in the continuation of the exterior surface 48 of the panel 40, thus maintaining the aerodynamic continuity of the fuselage.

Advantageously, the turned-in edge 164 improves the mechanical stability of the edge of the opening 42.

Next, in order to avoid having to drill and weaken the panel 40 at the edge (64, 164) of the opening 42, the means 84 of joining the internal and external (70, 72) components together are situated beyond the edge in the direction towards the centre of the opening 42.

The internal 70 and external 72 components are surface-to-surface against each other at a central portion 86 of the surround 44, the central portion 86 being situated immediately after the fixing means (62, 162) and the edge (64, 164) in the direction towards the centre of the opening 42.

The two components (70, 72) may be joined together by various means known to those skilled in the art but, for preference, the two components are connected using screws distributed about the circumference of the opening 42 and in the region of the central portion 86 of the surround 44.

According to an alternative form illustrated in FIGS. 2 and 3, the internal component 70 incorporates a stiffener 88 in the form of a wall 90 substantially perpendicular to the panel 40 and extending towards the inside thereof, the stiffener 88 improving the mechanical stability of the edge 64 of the opening 42.

The wall 90 is manufactured as one with the internal component 70 and extends normal to the edge 64.

Figure 1:
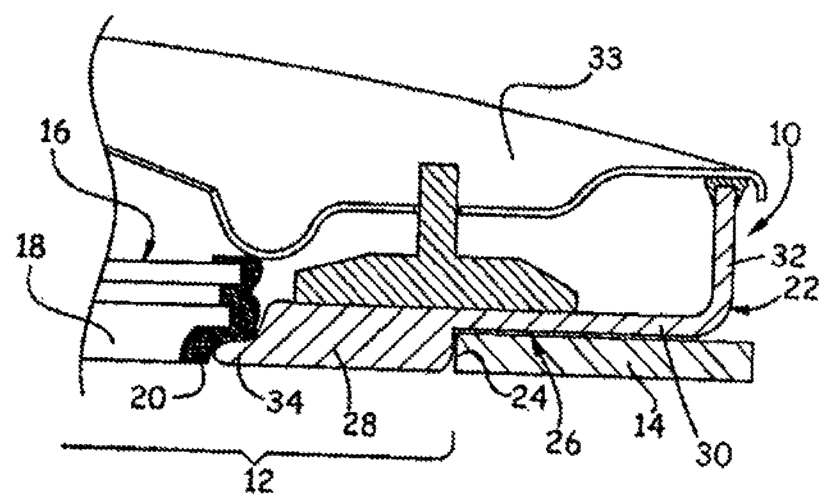
FIG. 1 is a view in cross section of an aircraft panel comprising an opening equipped with a surround according to the prior art.

Advantageously, the wall 90 also allows the retaining device 33 according to the prior art and introduced in the preamble and in FIG. 1 to be reused for holding the window-pane 50/seal 52 assembly pressed against the lip 54 of the surround 44 according to the invention.

For preference, the lip 54 against which the window pane 50 and its peripheral seal 52 press forms an integral part of the external component 72, the lip being located immediately after the central portion 86 of the surround 44 when considering the direction towards the centre of the opening 42.

According to a second embodiment of the panel, illustrated in FIG. 4 and which is aimed at dispensing with the additional retaining device like the one used in the prior art, provision is made for means 92 of holding the window 46 against the lip 54 to be incorporated into the surround 44.

These holding means 92 consist of a continuation 94 of the internal component 70 towards the centre of the opening at a non-zero clamping distance D of the lip 54 of the external component 72, the seal 52 and the pane 50 of the window 46 being intended to be clamped between the continuation 94 and the lip 54.

The continuation 94 is continuous over the entire circumference of the opening 42, but the present invention also covers alternative forms in which this continuation 94 is discontinuous.

In order to hold the window 46 firmly and adjust the clamping distance D to suit the dimensions of the window pane 50 and of the seal 52, at least one packing piece 96 can be interposed between the continuation 94 and the window 46. Thus, in this second embodiment of the panel 40, the window 46 is held in position and the surround 44 is fixed to the panel simultaneously and in a similar way by fitting means 84 that join the components (70, 72) together.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An aircraft panel comprising at least one opening, defining an edge of the panel, equipped with a surround configured to accept a closing-off device that closes off the at least one opening, the panel comprising at least one exterior surface, wherein the surround surrounding the at least one opening is fixed to the panel, forming an interface for fitting the closing-off device, and comprises at least one lip extending towards the centre of the at least one opening, the at least one lip supporting the closing-off device, wherein the surround has an external face interposed between the exterior surface of the panel and the closing-off device; and wherein the panel has an outside and an inside surface wherein the surround clamps at least a portion, of a length L, of the edge by clamping onto the outside and the inside surfaces.

2. The aircraft panel according to claim 1, wherein the portion is situated at an end of the edge.

3. The aircraft panel according to claim 1, wherein the surround is made of at least two independent components comprising an internal component and an external component which are respectively positioned on the inside and on the outside of the panel and joined together in such a way as to clamp the edge of the at least one opening.

4. The aircraft panel according to claim 3, wherein each of the internal and external components respectively comprises an extended portion on a corresponding side of the panel and in the direction away from the centre of the at least one opening, each extension respectively comprising at least one face resting against the edge of the panel and covering at least a portion, of a non-zero length (L), of the edge.

5. The aircraft panel according to claim 4, wherein the edge of the at least one opening is straight and comprises a recess taking the form of a shoulder on the outside of the panel and accommodating the extended portion of the external component.

6. The aircraft panel according to claim 4, wherein the edge of the at least one opening turns in towards the inside of the panel and towards the centre of the at least one opening to accept the extension of the external component.

7. The aircraft panel according to claim 6, wherein the external face of the surround is borne by the external component, and wherein the depth (P) of the recess and the thickness (M) of the extended portion, or the inclination of the turned-in edge and the inclination of the face of the extended portion, are dimensioned so that the external face lies flush with the exterior surface of the panel, or is inset towards the inside of the panel.

8. The aircraft panel according to claim 6, wherein the external face of the surround is borne by the external component, and wherein the depth (P) of the recess and the thickness (M) of the extended portion, or the inclination of the turned-in edge and the inclination of the face of the extended portion, are dimensioned so that the external face lies flush with the exterior surface of the panel, or is inset towards the inside of the panel.

9. The aircraft panel according to claim 3, further comprising means of joining the internal and external components together located beyond the edge in the direction towards the centre of the at least one opening.

10. The aircraft panel according to claim 3, wherein the surround comprises a continuation of the internal component towards the centre of the at least one opening at a non-zero distance (D) of clamping of a lip of the external component.

* * * * *